(12) United States Patent
Scerbak et al.

(10) Patent No.: US 7,426,325 B2
(45) Date of Patent: Sep. 16, 2008

(54) COMPACT, HIGH POWER, FIBER PIGTAILED FARADAY ISOLATORS

(75) Inventors: David Gerald Scerbak, Traverse City, MI (US); Eric Sean Pooler, Traverse City, MI (US)

(73) Assignee: Electro-Optics Technology, Inc., Traverse City, MI (US)

( * ) Notice: Subject to any disclaimer, the term of this patent is extended or adjusted under 35 U.S.C. 154(b) by 0 days.

(21) Appl. No.: 11/549,061

(22) Filed: Jan. 4, 2007

(65) Prior Publication Data

US 2008/0165418 A1 Jul. 10, 2008

(51) Int. Cl.
G02B 6/26 (2006.01)

(52) U.S. Cl. .......................................... 385/31
(58) Field of Classification Search .................... 385/31
See application file for complete search history.

(56) References Cited

U.S. PATENT DOCUMENTS

| | | | |
|---|---|---|---|
| 4,178,073 A | | 12/1979 | Uchida et al. |
| 4,548,478 A | | 10/1985 | Shirasaki |
| 5,408,354 A | | 4/1995 | Hosokawa |
| 5,521,741 A | * | 5/1996 | Umezawa et al. ........... 359/246 |
| 5,627,848 A | * | 5/1997 | Fermann et al. ................ 372/18 |
| 5,715,080 A | * | 2/1998 | Scerbak ........................ 359/281 |
| 5,793,521 A | * | 8/1998 | O'Brien et al. .............. 359/344 |
| 5,835,199 A | * | 11/1998 | Phillips et al. .............. 356/5.03 |
| 6,640,027 B2 | * | 10/2003 | Kim et al. ..................... 385/28 |
| 7,306,376 B2 | * | 12/2007 | Scerbak et al. ................. 385/76 |
| 2001/0043772 A1 | * | 11/2001 | Sorin ........................... 385/28 |
| 2007/0172174 A1 | * | 7/2007 | Scerbak et al. ................. 385/76 |

* cited by examiner

*Primary Examiner*—Ellen Kim
(74) *Attorney, Agent, or Firm*—Townsend and Townsend and Crew LLP; Kenneth R. Allen

(57) ABSTRACT

Faraday rotator or isolator with mode stripping ferrules and collimators having fiber pigtailed mode stripping components. An example is a compact Faraday Isolator module employing mode stripping ferrules and mode stripping collimators at the input and/or at the output of a fiber pigtailed Faraday Isolator. Two basic isolator types are a Polarization Independent Faraday isolator and a Polarization Maintaining Faraday isolator. The device is substantially immune to damage due to back-reflection, thermal lensing, energy leakage and absorption. Mode stripped optical energy propagating in the reverse direction is diverted onto a heat absorbing and heat sinking structure, as for example at the input of a compact birefringent wedge-based PI isolator. Alternatively, the optical energy propagating in the reverse direction is angularly refracted away from the forward incident beam path and is coupled into the energy dispersive cladding of the input fiber or the ferrule itself.

13 Claims, 2 Drawing Sheets

COMPACT, HIGH POWER, FIBER PIGTAILED FARADAY ISOLATORS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to Faraday rotators and particularly Faraday isolators for use with high power lasers. Faraday isolators capable of withstanding high power are required to decouple high power laser sources from reflective targets. Reflections can damage the laser and/or cause it to operate erratically. Lasers used in industrial metalworking applications are particularly prone to reflections from metal workpieces. For example, metal targets can couple nearly 100% of the incident radiation back into industrial 1 µm laser sources.

Optical fiber is particularly useful for delivering high power laser radiation in industrial environments. It is sealed from dust and other contaminants. It is flexible, durable and lightweight. Fiber lasers are particularly efficient laser sources for high power industrial use. A fiber laser can be readily coupled to an optical fiber. It is therefore desirable to mate optical fiber to high power Faraday isolators.

Laser radiation guided within optical fiber is converted into a free space beam when used with a Faraday isolator. This is often achieved by allowing laser radiation emanating from the core of an optical fiber termination to diverge to the desired size and then collimating this radiation into a beam with a lens. Such a combination of elements is called a fiber collimator. The free space beam out of a first fiber collimator is then transmitted through a Faraday isolator where it may be further directed onto a target directly or it may be re-coupled back into a second fiber collimator for fiber beam delivery. Faraday isolators used with one or more fiber collimators are often described as fiber pigtailed Faraday isolators.

Faraday isolators which are fiber pigtailed on the input and output have been widely used for low power applications, such as fiber optic telecommunications. In such devices radiation transmitted in the forward direction which does not couple into the core of the output fiber is of such low power that it cannot damage anything in the fiber collimator structure. With high power lasers however, the optical radiation (e.g., IR light) which does not couple into the core of the output collimator either couples into the surrounding cladding layer, from which it ultimately diverges and readily burns the optical fiber polymer protective coating layer, thereby destroying the fiber, or it destroys the fiber collimator if it strikes any adhesives which hold the fiber in alignment. This is a practical problem for fiber pigtailed high power Faraday isolators because Faraday isolators are used at wavelengths near an absorption peak where there is always a residual absorption. This is done because Faraday Rotation greatly increases near an absorption, allowing the Faraday isolator to be smaller and less expensive. This residual absorption leads to a temperature gradient across the beam profile within the Faraday optical material, the magnitude of which increases with increasing laser power. This thermal profile leads to two thermal effects within the Faraday optic: thermal lensing and thermal birefringence. For substantially round laser beams, the thermal gradient is parabolic and acts, to first order, as a spherical lens. Increasing the beam size through the Faraday optic can reduce this thermal lensing, but it does so at the expense of making the device bulkier. The thermal lens changes the beam parameters such that optical radiation from a first fiber collimator does not completely couple into the core of a second fiber collimator at all laser operating powers. Thermal birefringence changes polarization states emanating from a first (input) fiber collimator as they propagate through the Faraday isolator. These changed polarization states will also not couple efficiently into the core of a second (output) fiber collimator. Therefore, a structure is desired which does not lead to damage in the presence of thermal effects in a high power fiber pigtailed Faraday isolator.

There are two types of Faraday isolators used with lasers: Polarization Maintaining ("PM") isolators and Polarization Insensitive ("PI") isolators. PM isolators are used with laser sources which have output radiation that is polarized. They require linear polarizers at the input and output joining a 45° Faraday Rotator. Fiber pigtailed PM isolators have been used with PM fiber which maintains the launched linear polarization into, and out of, the linear polarizers of the PM Faraday isolator. For low power operation the linear polarizers can be absorptive type polarizers such as Corning Polarcor™ polarizer (Corning Glass Works of Corning, N.Y.) or scattering/mode stripping fiber types exemplified by Corning Single Polarization Fiber or Crystal Fibre LMA PZ 20 Large Mode Area Polarizing Fiber (Crystal Fibre of Birkerod, Denmark). Polarcor is a thin (typically 0.5 mm) glass plate polarizer that absorbs any polarization component orthogonal to the polarization transmission axis. Corning Single Polarization Fiber, for example, rejects any component of radiation polarized orthogonal to the transmission axis into the cladding where it is ultimately stripped in the polymer protective coating. Typically lengths of one hundred centimeters or more are required to ensure highly linear polarization. Because it can be fusion spliced to commonly used PM fiber, this structure is of a form that is convenient for robust, compact, low power isolators.

However, these types of polarizers function by absorbing or scattering the undesired polarization component. Thus, they are readily prone to failure if the same designs are employed for high power applications. In contrast, for high power operation, the linear polarizers are typically polarizing beam-splitter cubes or Brewster-angle thin film polarizers. Any polarization component orthogonal to the transmission axis of such polarizers is angularly rejected away from the beam path. Because the rejected polarization means that energy is directed away from the beam path, such polarizers are located outside of the magnet body so that the rejected radiation can be directed onto a beam dump. This design has in the past required that the size of the Faraday isolator be even larger than for low power applications. A robust, compact, fiber pigtailed Polarization Maintaining Faraday isolator suitable for use with high power lasers is desired.

Polarization Insensitive Faraday isolators are useful with lasers sources which are unpolarized or randomly polarized. There are two common ways to construct PI isolators. The first approach, as for example disclosed in U.S. Pat. No. 4,178,073, is the use of a birefringent crystal beam displacer to split a laser beam into two distinct beams of orthogonal polarization. In operation the device transmits the beams first through 45° of non-reciprocal Faraday rotation and then through 45° of reciprocal optical rotation (using a quartz rotator or waveplate), and finally recombines the two beams in a second beam displacer. A disadvantage of this approach is that the effective aperture size of the Faraday isolator is typically doubled in order to transmit both orthogonally polarized beams. The result is that an already bulky magnetic encasement must be even larger. Furthermore, common birefringent beam displacers have lengths which are approximately ten times as large as the laser beam diameter. For high power laser application where it is desired to increase the laser beam size to reduce thermal lensing, the indicated size of such beam displacers is very large and difficult to fabricate with high optical quality. Even so, such bulky designs have found wide usage in industrial settings with fiber pigtailing because any reflected power back into the isolator is blocked by physical beam blocks rather than being coupled back into the input fiber collimator where damage could occur.

The second basic approach, which is used to achieve Polarization Independent Faraday Isolation as disclosed in U.S. Pat. No. 4,548,478, is to use birefringent wedges. In a common design, laser light from an input fiber collimator is directed through an input birefringent wedge. The orthogonally polarized birefringent axes define two different refractive indices which refract the two polarizations into slightly different angles. The 45° of Faraday rotation then rotates the polarization axis into that of a second, output birefringent wedge if the second wedge also has its birefringent axis rotated 45° to the input wedge polarization axis. In such a PI isolator, if a second wedge is also oriented at the output in a flipped mirror image to the input wedge about a reflection axis through the middle of the Faraday isolator, then the orthogonally polarized beams exit the output wedge in parallel with one another, but displaced by a small amount, with low transmission loss. With such an approach any reflected light back into the Faraday isolator is given an additional, non-reciprocal, 45° of Faraday rotation such that the backward propagating polarization states are rotated 90° at the input birefringent wedge. The input wedge then refracts the two backward propagating polarization states away from the input beam path by a small angle (on the order of 1-2°).

Low power fiber pigtailed isolators used for telecom applications in the wavelength range of 1.5 µm typically use highly efficient, low absorption Faraday rotators such as Bismuth Iron Garnet ("BIG") that can achieve 45° of Faraday rotation in a few millimeters or less. Because the Faraday rotation occurs in such a short length, the small angular deviation through the "BIG" optic after the first birefringent wedge (on the order of 4°) does not require the aperture size of the Faraday isolator to significantly increase beyond the beam size. For this reason birefringent wedge based PI isolator designs are more compact and less expensive than beam displacer based PI isolator designs at telecom wavelengths. Fiber pigtailed PI isolators using birefringent wedges have been the dominant basic form used at low powers.

However, at typical high power laser wavelengths, 1 µm for example, Terbium Gallium Garnet ("TGG") is a common Faraday optic material. TGG is a much less efficient Faraday optic material than BIG, which cannot be used at such wavelengths due to a strong absorption. For high magnetic fields, on the order of 10,000 gauss, approximately 2 cm of TGG is required for 45° rotation at 1065 nm. In this case, the small angular deviation in birefringent wedge-based PI isolator designs through the approximately 2 cm TGG optic requires the magnet aperture size to be increased. This significantly increases the size of the overall package. It is further desired to have the original input beam path restored after traversing all optics to simplify alignment and maximize coupling efficiency from fiber to fiber. Additionally, in numerous instances it is desired to have a fiber pigtailed input and a free space output beam. In such usage, it is desired to have the two polarization components of the PI isolator perfectly overlapped at the output in order to achieve minimum focused spot size at the workpiece. Hosokawa in U.S. Pat. No. 5,408,354 discloses the use of a birefringent crystal plane plate beam displacer to bring the two polarization component beams out of first and second birefringent elements to converge the two polarization components back into coincidence. Although the output beam path as disclosed is parallel to the input beam path, it is however displaced from the input beam axis—which causes the magnet aperture size to increase. All of the factors listed above increase the magnet aperture size of birefringent wedge based designs when used with high power Faraday optic materials. This diminishes the potential size and cost benefits which birefringent wedge based PI isolator designs have over a bulky beam displacer based approach. A birefringent wedge based fiber pigtailed PI isolator design for high power applications which maintains the beam path through the Faraday isolator and does not require the magnet aperture size to increase is desired.

In fiber pigtailed PI isolators in lower power applications, the isolated power directed into the cladding layer and stripped by the polymer coating is well below the threshold for material damage. However at average power levels as low as 10 W, such isolated power can damage the protective polymer coating of the input fiber. Thus, fiber pigtailed birefringent wedge based PI isolators have not been considered suitable for high-power applications.

What is needed is a compact Faraday isolator for high power applications, and in particular an inherently small PI Faraday isolator, such as a fiber pigtailed Faraday isolator that does not require an enlarged clear aperture and resists internal damage at high power.

SUMMARY OF THE INVENTION

According to the invention, mode stripping fiber ferrules and collimators are combined in a compact Faraday isolator module. The Faraday isolator module employs mode stripping ferrules and/or mode stripping collimators at the input and at the output of a fiber pigtailed Faraday isolator. Mode stripping ferrules are fiber terminations which safely remove radiation in cladding modes, as well as other radiation that cannot be guided by the fiber core away from the fiber, before such radiation can damage any protective coating or jacket surrounding the optical fiber. For use at high power, mode stripping ferrules usually have a section of undoped fiber (an "endcap") to allow radiation emanating from, or entering into, the fiber core to be of larger beam size so as not to cause surface damage at the ferrule/air interface. The ferrule endface may be angled and is usually anti-reflection coated. Mode stripping collimators are either mode stripping ferrules mated to discrete lenses to form a collimated beam or mode stripping ferrules with a lens formed directly onto the end of the endcap of the ferrule. Mode stripping ferrules and collimators are capable therefore of safely removing optical energy launched into the cladding due to thermal lensing/birefringence before it can damage the fiber. The resulting fiber pigtailed Faraday isolator is suitable for high power applications, being substantially immune to damage due to back-reflection, thermal lensing, thermal birefringence, energy leakage and absorption.

Two basic isolator types can be fabricated according to the invention: a Polarization Maintaining (PM) Faraday isolator and a Polarization Independent (PI) Faraday isolator. In particular embodiments, mode stripped laser power is directed onto a heat absorbing and heat sinking strain relief structure, as for example at the input of a compact birefringent wedge based PI isolator. In operation of such a device, optical energy propagating in the reverse or isolation direction is angularly refracted away from the forward incident beam path and is coupled into the cladding of the input fiber or the ferrule itself. Alternatively, the optical energy is intentionally reflected and/or scattered away from the fiber onto, for example, an absorbing heat sink.

An advantage of the invention is the realization of compact Polarization Maintaining Faraday isolators that are also low cost and robust. In addition to stripping any cladding modes due to thermal effects, the mode stripping elements, namely ferrules/collimators, strip the polarization scattered into the cladding by the single polarization fiber. The length of the mode stripping ferrule is chosen such that the rejected polarization power is safely below the threshold for material damage in the fiber polymer protective coating.

Beyond the examples of a mode stripping ferrules described herein, there are other suitable ferrule designs, as for example described in U.S. patent application Ser. No. 11/338,429 filed Jan. 23, 2006, entitled Monolithic Mode Stripping Ferrule, and assigned to the same assignee as the present application. The content of that disclosure is incorporated herein by reference for all purposes.

A further aspect of the present invention is the arrangement by proper tilting of the surfaces of the birefringent wedges relative to the Faraday optic such that the original beam path and the initial beam parameters of a laser beam are restored so it is along a reasonably straight and narrow path through a passage in the magnet package, after the beam has propagated through the wedges, Faraday optic and a final beam displacer. This aspect of the invention allows the magnet package to be compact so as to be consistent with the compact optical structure enabled by mode stripping collimators.

One advantage of the present invention is that use of a mode stripping ferrule/collimator on the output of a Faraday isolator enables consistent output beam focusing properties at high average power. The focusing beam parameters of the beam exiting the output fiber are dictated by the wave-guiding properties of the fiber itself, independent of changes in average laser power or any variable thermal lensing present in the optical elements within the Faraday isolator.

In an embodiment of the invention, at least one detector or thermal sensor is mounted in the collimator fiber strain relief cover to quantitatively monitor the magnitude of radiation scattered from the mode stripping collimators, if desired. Such monitoring could be used, for example, to quantify backward propagating radiation that is scattered by the input collimator for various system feedback purposes.

The invention is not limited to fiber pigtailed Faraday isolators. Other fiber pigtailed Faraday devices, such as circulators, rotators and Faraday mirrors suitable for high power applications, are contemplated by the invention.

The invention will be better understood upon reference to the following detailed description in connection with the accompanying drawings.

DETAILED DESCRIPTION OF THE INVENTION

Reference is now made in detail to specific embodiments representative of the present invention to illustrate the practice of the invention as contemplated by the inventors. Additional features are described in connection with each embodiment. Alternate embodiments will be apparent to those of ordinary skill in the art in light of these descriptions.

Figure 1:
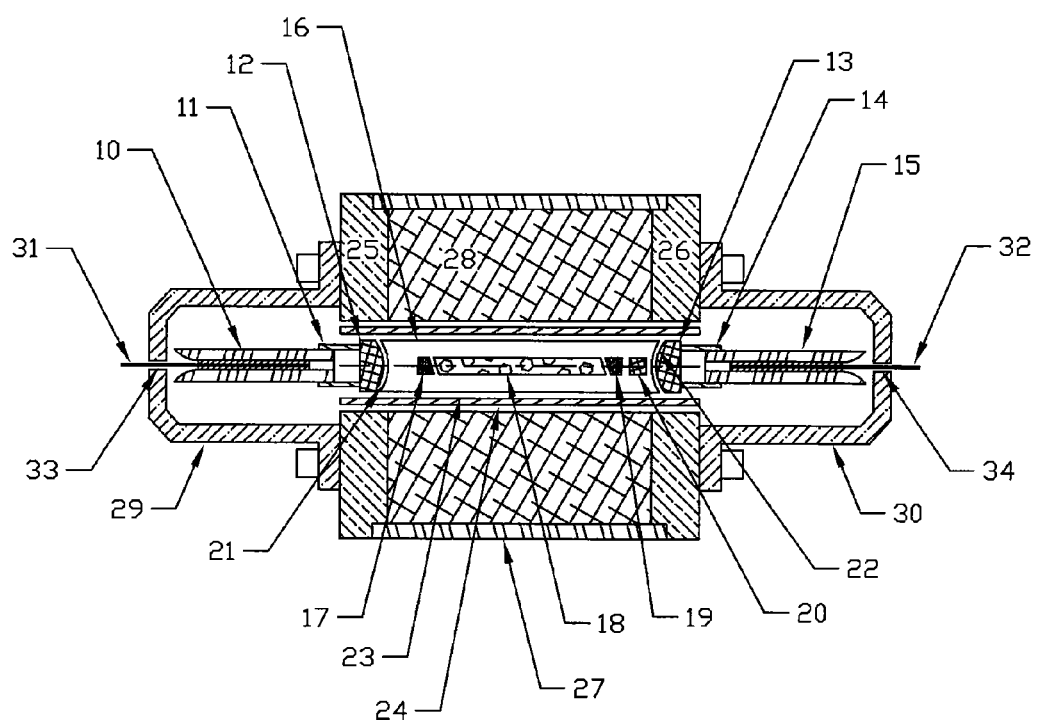
FIG. 1 is a side cross-sectional view of a first embodiment of a high power fiber pigtailed Polarization Insensitive Faraday isolator according to the invention which is suitable for use at 1060 nm optical frequency.

FIG. 1 is a side cross-sectional view of a Polarization Independent Faraday isolator module according to the invention, wherein monolithic fused silica mode stripping ferrules 10 and 15 are employed. Suitable examples of such ferrules 10 and 15 are described in the disclosure of the above referenced commonly-owned patent application incorporated herein by reference. Input silica fiber 31, monolithic ferrule 10, fused silica sleeve 11 and silica aspheric lens 12 together form a substantially stable and compact mode stripping input fiber collimator assembly. Similarly, an output pigtailed collimator assembly is formed by fiber 32, ferrule 15, sleeve 14 and lens 13. In both assemblies, the ferrule 10, 15 and optical surfaces of lenses 21, 22 are anti-reflection coated at the operating wavelength, herein for example 1060 nm. Non-magnetic, rigid optics holder 16 is made of a metal chosen to have a high thermal conductivity and a coefficient of thermal expansion that is substantially the same as that of an anti-reflection coated Terbium Gallium Garnet ("TGG") Faraday optical element 18, which is the core of the Polarization Independent Faraday isolator. Anti-reflection coated birefringent crystal wedges 17 and 19 are provided, typically made of Vanadate, a commercially available crystal. Other materials that are suitable in many instances are calcite, lithium niobate and rutile. The anti-reflection coatings on TGG optic 18 and wedges 17 and 19 are optimized to ensure that the wedged surfaces have no significant polarization-dependent loss. A beam displacer 20 is also in the optical path, typically also formed from Vanadate and also anti-reflection coated. Bonds 21 and 22 may use, for example, a high hardness, high glass transition temperature UV-activated heat cured adhesive or laser-fused transparent glass powder. An adhesive 23 is provided which is thermally conductive, soft and resilient to ensure that the bonded optical structure is decoupled from any stresses imparted by the surrounding magnetic structure. The magnet structure includes a permanent magnetic circuit 28, magnet housing tube 27 and endplates 25 and 26.

In operation, thermally conductive adhesive 23 transfers heat from any absorbed power in the TGG rotating optic 18 through the metal optics holder 16 into a high thermal conductivity heat transfer tube 24. Conductive covers 29 and 30 encircling the ferrules 10 and 15 and mounted to the endplates 25 and 26 absorb heat scattered by mode stripping ferrules 10 and 15 and conduct this heat to endplates 25 and 26. Covers 29 and 30 may be made, for example, from clear anodized aluminum cups bolted to the endplates 25 and 26 and having orifices 33, 34 for the fibers 31, 32. Adhesive at orifices 33 and 34 strain relieves optical fibers 31 and 32 to covers 29 and 30. Laser light propagating in the forward, transmission direction which does not couple into the core of output fiber 32, for example due to thermal lensing in TGG rotating optic 18, is scattered or reflected away from the fiber by ferrule 15. Laser optical energy propagating in the reverse, isolation direction, is angularly directed into the cladding of the input fiber or into the ferrule 10 itself, where it is scattered and also reflected away from the fiber. The input face of birefringent wedge 17 and output face of birefringent wedge 19 are at a small tilt to ensure no residual reflection from these surfaces couples into either optical fiber core. The remaining tilted faces of the birefringent wedges 17 and 19, and TGG rotating optic 18, are selected according to the thickness/length and refractive index of these materials such that forward propagating rays travel on the same beam path as the incident beam path after exiting beam displacer 20. For optical fibers, such as Corning HI1060, and a 950 µm collimated beam diameter, an isolator constructed according to this preferred embodiment is useable with power levels in excess of 25 W. Further applicability for applications where the focusing properties of the output beam must not change is guaranteed by the wave-guiding properties of the small (approximately 6 µm) core of the output fiber. Any changes in the beam parameters due to thermal lensing of optical elements within the Faraday isolator will result in that component of the output missing the core of the output fiber, thereby being removed in the mode stripping output ferrule.

Figure 2:
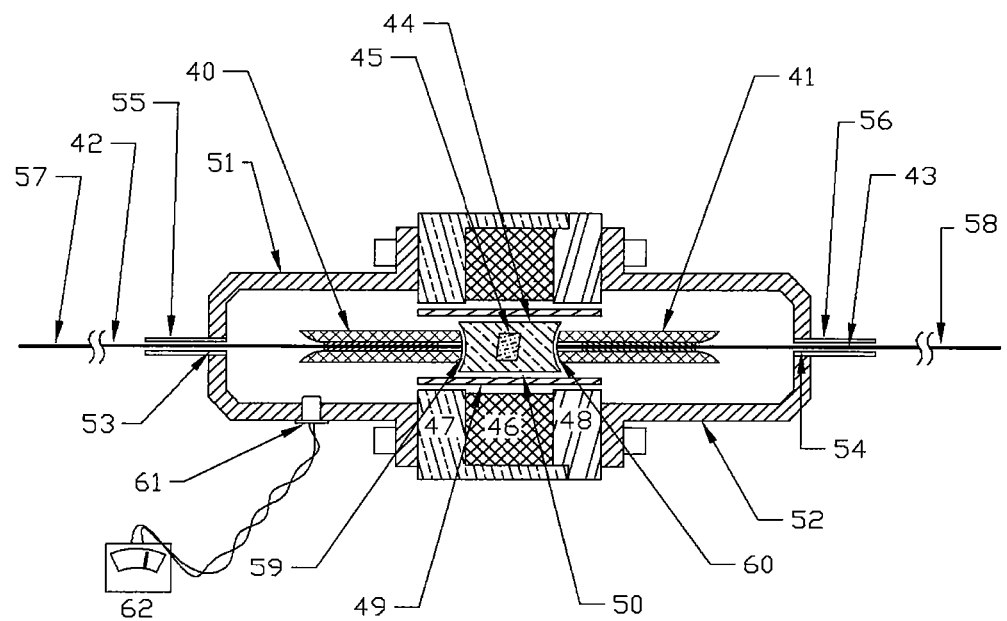
FIG. 2 is a side cross-sectional view of a second embodiment of a high power fiber pigtailed Polarization Maintaining Faraday isolator suitable for use at 1550 nm and including selected enhancement features.

An alternative embodiment of the present invention, a high-power fiber-pigtailed Polarization Maintaining Faraday isolator (designed to operate at for example 1550 nm), is illustrated in the side cross-sectional view of FIG. 2. Suitable examples of input monolithic collimator 40 and output monolithic collimator 41 are described in the disclosure of the above-referenced commonly owned patent application incorporated herein by reference. Preferably, a lens is formed directly on the ferrule optical surface at 59 and 60. Input PM fiber 57 is fusion spliced to a suitable length of input Corning SP 1550 single-polarization fiber 42. For 30 dB extinction, the length of SP1550 fiber requires a length of one meter. Faraday optic element 45 is disposed in the beam path within the magnet structure. The material of the Faraday optic element 45 is, for example, Mitsubishi "P-Type" low absorption Bismuth-substituted Iron Garnet (BIG) having a specified absorption of less than 0.05 dB. Faraday optic 45 is tilted (by approximately 1°) to ensure that residual reflections do not couple into either fiber, and it is bonded to optic holder 44. This results in only a small (approximately 5 µm) displacement of the collimated beam from the initial beam path out of collimator 40. Thus the displacement does not significantly reduce coupling to output collimator 41 if it is kept centered on the original beam path. The optic holder is typically a non-magnetic metal with high thermal conductivity and a coefficient of thermal expansion matched to that of the Faraday optic 45. An encircling permanent magnet 46 with a central passage of minimal size operates to saturate the magnetization of Faraday optic 45 so that its optical properties are activated. Housing 47, cover 48 and heat transfer tube 49 form a housing assembly that encloses the Faraday optic 45, magnet 46 and optic holder 44. In operation, a soft, resilient, high thermal conductivity adhesive bond at interface 50 transfers heat from the optic holder 44 to the heat transfer tube 49, where the heat is further conducted to the housing assembly. Bonds at orifices 53 and 54 secure and strain relieve optical fibers 42 and 43 to covers 51 and 52 which are secured to housing 47 and cover 48. Short flexible tubes 55 and 56 protect the fiber 42 and 43 from sharp bends by restraining the bend radius. For 30 dB isolation output (optional), type SP 1550 single-polarization fiber 43 is of the same 1-meter length as input single polarization fiber 42. Fiber 43 is fusion spliced to the Polarization Maintaining fiber 58. The polarization axis of output monolithic collimator 41 and output single polarization fiber 43 is rotated 45° with respect to the polarization axis of input monolithic collimator 40 and fiber 42 to account for the 45° Faraday rotation in Faraday optic 45 prior to bonding the collimators 40 and 41 to the optics holder 44 with adhesive at surfaces 59 and 60. The polarization of backward propagating radiation entering the lens face of collimator 40 is 90° to the polarization axis of the collimator 40. Hence, this light (optical energy) is rejected into the cladding of fiber 42 within the mode stripping collimator 40, where it is scattered and reflected onto cover 51. A device built according to this embodiment can achieve isolation in excess of 30 dB with in excess of 15 W of incident power. The mode stripping collimators 40 and 41 should be 5 cm long in order to reduce rejected polarization power levels safely below 10 W under all operating conditions in order to not destroy the polymer protective coating. The beam focusing parameters are dictated by output PM fiber 58, rather than by any thermal lensing in Faraday optic 45. Backward propagating radiation into mode stripping collimator 40 is scattered toward photodetector 61, which generates a signal proportional to the magnitude of the backward propagating radiation as displayed on meter 62.

Figure 3:
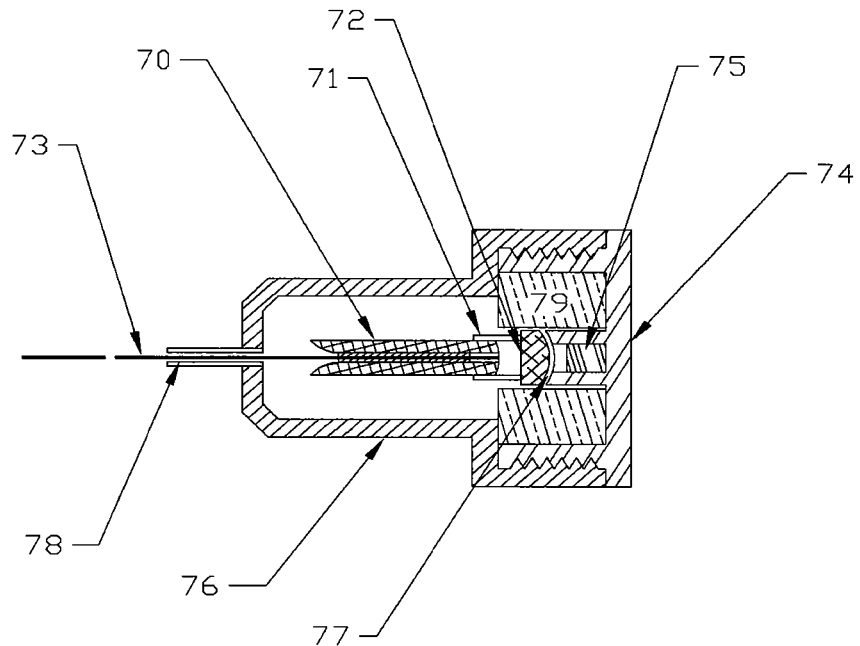
FIG. 3 is a side cross-sectional view of a third embodiment according to the invention, and in particular of a high power fiber pigtailed Faraday mirror suitable for use at 1550 nm.

FIG. 3 is exemplary of alternative embodiments of the present invention. A side cross-sectional view of a high-power fiber-pigtailed Faraday mirror according to the invention is shown (designed to operate at for example 1060 nm), wherein a monolithic fused-silica mode stripping ferrule 70 is employed. Suitable examples of such ferrules are described in the disclosure of the above referenced commonly owned patent application incorporated herein by reference. Silica fiber 73, monolithic ferrule 70, fused silica sleeve 71 and fused silica lens 72 together form a mode stripping fiber collimator assembly. The Faraday optic is a transparent polycrystalline ceramic Terbium Aluminum Garnet ("TAG") rod 75. The TAG ceramic rod 75 is anti-reflection coated on the optical surface adjacent to the lens 72. The other surface of the TAG rod 75 is given a high reflectance coating at the operating wavelength of 1060 nm. TAG rod 75 is mounted in conductive metal mount/endplate 74 and surrounded by magnetic circuit 79. This mount is threaded on the periphery to mate to a heat-sinking strain relief cover 76. Adhesive 77 secures the fiber collimator assembly lens 72 to a matching spherical surface machined into mount/endplate 74. Adhesive 78 secures fiber 73 to strain relief cover 76. Fiber pigtailed Faraday mirrors are commonly used between fiber amplifiers or within a double pass fiber amplifier to flip polarization states upon 90 degree reflection in the Faraday mirrors. Polarization flipping between amplifier stages or within a double pass amplifier can help remove any undesirable polarization distortions in a fiber amplifier system. As disclosed here, a fiber pigtailed Faraday mirror can be used with very high power fiber lasers and fiber amplifiers where polarization effects are important.

The invention has now been explained with respect to specific exemplary embodiments. Other embodiments will be apparent to those of ordinary skill in the art upon reference to these descriptions. For example the foregoing description also applies to structures not requiring a magnet assembly, such as a device wherein there is inherent polarization rotation applied to the incident beam. It is therefore not intended that this invention be limited, except as indicated by the appended claims.

What is claimed is:

1. A high power optical device employing Faraday rotation comprising:
   at least one optical fiber having optical fiber coatings and an output end;
   a mode stripping element attached to said output end of the optical fiber and configured for diverting uncoupled optical energy that is of sufficiently high power to damage the optical fiber coatings;
   a lens aligned to the optical fiber for collimating radiation in and out of said mode stripping element;
   said optical fiber, said mode stripping element and said lens together forming a fiber pigtail; and
   at least one high power Faraday optical element aligned with said fiber pigtail for receiving collimated radiation through said fiber pigtail.

2. The device according to claim 1, further including:
   at least one sensor disposed in said device for monitoring power from said diverted uncoupled optical energy.

3. The device according to claim 1, further including:
   a heat absorptive cup encasing said mode stripping element.

4. A compact high power Polarization Insensitive Faraday isolator module comprising:
   an input optical fiber having optical fiber coatings and an output end;
   a first mode stripping element disposed at the output end of the input optical fiber as a first ferrule for diverting uncoupled optical energy of sufficiently high power to damage the optical fiber coatings;
   a first optical coupling element aligned to the output end of said input optical fiber for collimating radiation in and out of said first mode stripping element;
   a Faraday optical element having a first end and a second end, said Faraday optical element being disposed to receive input from the input optical fiber;
   a rigid optics holder disposed to support said Faraday optical element;
   a first birefringent wedge disposed at said first end of said Faraday optical element; and
   a second birefringent wedge disposed at said second end of said Faraday optical element, said first and second birefringent wedges with said Faraday optical element being operative to effect beam isolation;
   said first mode stripping element being operative to divert uncoupled optical energy that is of sufficiently high power to damage the optical fiber coatings and that is propagated through said Faraday optical element, said uncoupled optical energy comprising reflections of source optical energy propagated through said Faraday optical element, said first mode stripping element being further operative to receive optical energy from said first optical coupling element to match with said first optical fiber, such that high power levels of optical energy can be attained in a compact structure without damage to components of the structure.

5. The Faraday isolator module according to claim 4 further including:
   an output optical fiber having optical coatings and an input end disposed to receive output of the second end of the Faraday optical element;
   a second mode stripping element disposed at the input end of the output optical fiber; and
   a second optical coupling element aligned to the input end of said output optical fiber for collimating radiation in and out of said second mode stripping element without damage to components of optical structure and the coatings of the output optical fiber.

6. The Faraday isolator module according to claim 4 further including:
   a magnet assembly having a central passage of minimal size encasing said Faraday optical element for activating said Faraday optical element and wherein at least the first and second birefringent wedges are tilted such that optical energy is propagated along a substantially straight and narrow path thereby allowing the magnet assembly to be relatively compact.

7. The Faraday isolator module according to claim 4, further including:
   a beam displacing element disposed following said second birefringent wedge, said beam displacing element being operative to displace beams of optical energy propagating in a first direction relative to beams of optical energy propagating in a second direction in a minimally sufficient amount to render an output beam propagation axis coincident with an input beam propagation axis realigning said beams to one another in a limited space.

8. The Faraday isolator module according to claim 7 wherein:
   said Faraday optical element is a length of material of the type Terbium Gallium Garnet (TGG), terbium Aluminum Garnet (TAG) or Bismuth Iron Garnet (BIG), and said first and second birefringent wedges and said beam displacing element are crystals of material of the type vanadate, calcite, lithium niobate or rutile.

9. The Faraday isolator module according to claim 7, further including:
   at least one sensor disposed in said module for monitoring power from said diverted uncoupled optical energy.

10. The Faraday isolator module according to claim 5, further including:
    first and second heat absorptive cups encasing said first and second mode stripping elements.

11. A compact high power Polarization Maintaining Faraday rotator module comprising:
    an input optical fiber having optical coatings and an output end, said input optical fiber being a selected length of polarizing fiber;
    a first mode stripping element disposed at the output end of the input optical fiber;
    a Faraday optical element having a first end and a second end, said Faraday optical element being disposed between the input optical fiber and an output and being tilted;
    a rigid optics holder disposed to support said Faraday optical element; and
    a first optical coupling element fixedly connecting said first end of said Faraday optical element and said first mode stripping element;
    said input optical fiber with said Faraday optical element effecting beam polarization rotation;
    said first mode stripping element being operative to divert uncoupled optical energy that is of sufficiently high power to damage the optical fiber coatings and that is propagated through said Faraday optical element,
    so that high power levels of optical energy can be attained in a compact structure without damage to components of the structure and the optical coatings.

12. The Faraday rotator module according to claim 11 further comprising:
    an output optical fiber having an input end, said output optical fiber being a length of polarizing fiber, thereby rendering the Faraday rotator module into a Faraday isolator module;
    a second mode stripping element disposed around the input end of the output optical fiber; and
    a second optical coupling element fixedly connecting said second end of said Faraday optical element and said second mode stripping element.

13. The Faraday isolator module according to claim 11, further including:
    at least one sensor disposed in said module for monitoring power from said diverted uncoupled optical energy.

* * * * *